United States Patent [19]
Leedom

[11] Patent Number: 6,165,547
[45] Date of Patent: Dec. 26, 2000

[54] ROLLED EDGE SEAL FOR ELECTROOPTIC DEVICE

[75] Inventor: Marvin A. Leedom, Princeton, N.J.

[73] Assignee: PPG Industries Ohio, Inc., Cleveland, Ohio

[21] Appl. No.: 09/190,710

[22] Filed: Nov. 12, 1998

[51] Int. Cl.[7] .................................................... B05D 1/40
[52] U.S. Cl. ........................ 427/169; 427/164; 427/284; 427/430.1; 427/443.2
[58] Field of Search .................... 427/284, 177, 427/164, 169, 430.1, 443.2

[56] References Cited

U.S. PATENT DOCUMENTS

| | | | |
|---|---|---|---|
| 2,385,653 | 9/1945 | Rockola | 427/284 |
| 4,976,998 | 12/1990 | Morimitu et al. | 427/284 |
| 5,206,756 | 4/1993 | Cheshire | 359/270 |
| 5,327,281 | 7/1994 | Cogan et al. | 359/270 |
| 5,471,338 | 11/1995 | Yu et al. | 359/273 |
| 5,618,390 | 4/1997 | Yu et al. | 204/192.26 |
| 5,657,150 | 8/1997 | Kallman et al. | 359/275 |
| 5,716,506 | 2/1998 | Maclay et al. | 204/424 |
| 5,916,398 | 6/1999 | Coleman et al. | 156/228 |
| 5,953,150 | 9/1999 | Smarto et al. | 359/265 |
| 5,969,847 | 10/1999 | Coleman et al. | 359/265 |

*Primary Examiner*—Shrive Beck
*Assistant Examiner*—Kirsten A. Crockford
*Attorney, Agent, or Firm*—William C. Mitchell

[57] ABSTRACT

A method for sealing the peripheral edge surface of a disc-shaped device is disclosed. The method involves contacting the peripheral edge surface to be sealed with a sealant layer or sealant precursor layer and rotating the device so as to roll its peripheral edge surface through the sealant layer or sealant precursor layer. Removal of the device followed by a curing step completes the process.

14 Claims, 5 Drawing Sheets

FIGURE 4
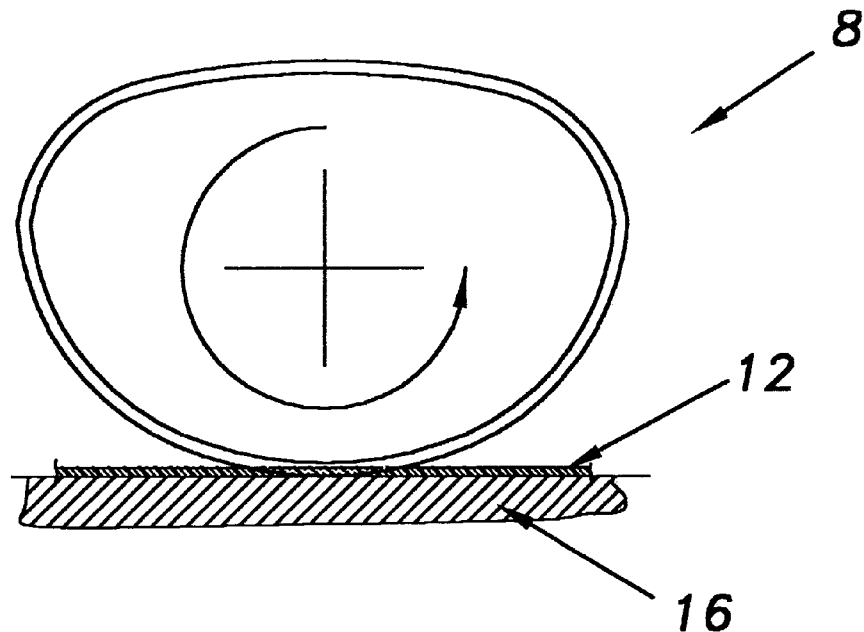
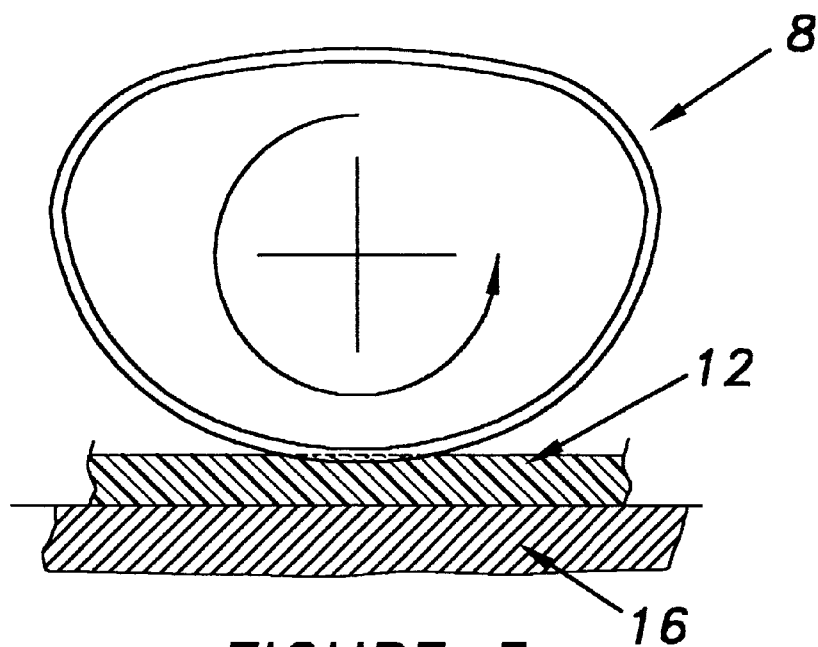
FIGURE 5

ROLLED EDGE SEAL FOR ELECTROOPTIC DEVICE

FIELD OF THE INVENTION

This invention relates to a novel technique for sealing the peripheral edge surface of a laminated electrooptic device, such as a laminated electrochromic lens, and to the resulting sealed device.

BACKGROUND OF THE ART

The optical properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic devices comprise at least one thin film of a persistent electrochromic material, i.e. a material which, in response to application of an electric field of given polarity, changes from a high-transmittance, non-absorbing state to a low-transmittance, absorbing or reflecting state. Since the degree of optical modulation is directly proportional to the current flow induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer which also serves as a laminating agent. The electrochromic film(s) and ion-conductive material are disposed between two electrodes, forming a laminated cell.

When the electrode adjacent to the electrochromic film is the cathode, application of an electric field causes darkening of a cathodically-coloring film. Reversing the polarity causes electrochromic switching, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate.

A typical laminated electrochromic lens comprises a first electroconductive material layer which serves as a first electrode, an electrochromic layer, an ion-conducting material layer and a second electroconductive layer which serves as a second electrode. Preferably, a complementary electrochromic layer is also used. These electroconductive and electrochromic layers, along with the ion-conducting material layer, can be arranged as a single stack deposited on a first lens which is then laminated to a second lens, or they can be arranged such that the electrodes are coated on separate lenses, followed by placement on the lenses of one or more electrochromic layers. The coated lenses are then laminated via a technique which positions an ion-conducting material between the coated lenses. Preferably, an ion-conducting polymer, which also serves as a bonding agent, is used to bond the complementary lenses.

As voltage is applied across the electrodes, ions are conducted through the ion-conducting material. To ensure reliable operation, the peripheral edge surface of the ion-conducting material layer generally must be sealed so as to maintain its water content within a range sufficient to provide required ion conductivity. Absent an adequate seal, moisture loss or gain through the exposed edge of the ion-conducting material layer impacts performance.

The peripheral edge surface of a laminated device may be shaped to support or interlock with an edge seal. For example, commonly owned U.S. Pat. No. 5,969,847 discloses a nubbed-edge design that facilitates application of an edge seal to the peripheral edge surface of an electrochromic device. Also, copending and commonly owned U.S. patent application No. 09/046,386, filed on Mar. 23, 1998, and U.S. Pat. No. 5,953,150 disclose methods for sealing laminated electrochromic devices.

U.S. Pat. No. 5,471,338 to Yu, et al., discloses lamination of two coated plastic substrates using a layer of polymer which bonds with both coated surfaces to form a composite. Homo and copolymers of 2-acrylamido-2-methyl propyl sulfonic acid (AMPSA) form the ion-conducting polymer layer.

U.S. Pat. No. 5,327,281 to Cogan discloses the use of epoxy to seal a cavity formed when a spacer is used to separate electrodes and contain a liquid electrolyte injected between the spaced electrodes.

U.S. Pat. No. 5,657,150 to Kallman et al., discloses an electrochromic device having an isolative barrier which electrically isolates the device electrodes.

BRIEF DESCRIPTION OF THE DRAWINGS

FIG. 4 is a front view of the laminated lens of FIG. 1, partially immersed in a sealant precursor layer while contacting the surface of a substrate holding the sealant precursor layer.

FIG. 5 is a front view of the laminated lens of FIG. 1, partially immersed in a sealant precursor layer without contacting the surface of a substrate holding the sealant precursor layer.

SUMMARY OF THE INVENTION

Figure 1:
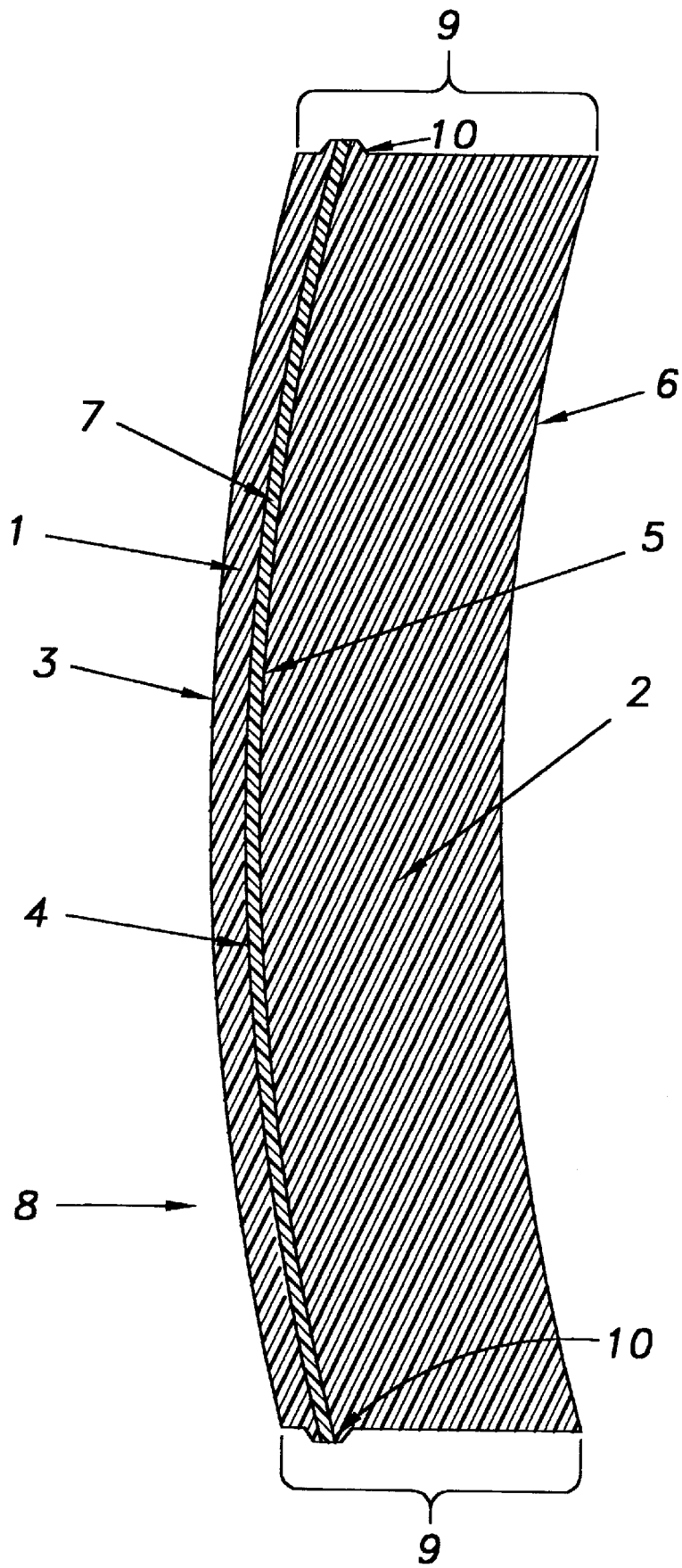
FIG. 1 is a cross-sectional side view of a laminated lens showing the profile of a peripheral nub at the interface of the lenses forming the laminate.

Other than in the Examples, or where otherwise indicated, all numbers quantifying ingredients, annotations, dimensions, ratios, ranges, reaction conditions, etc., used herein are to be understood as modified in all instances by the term "about".

The instant invention relates to a method for applying an edge seal to the peripheral edge surface of a device, preferably a disc-like electrooptical device, and is particularly useful for sealing laminated electrochromic devices such as electrochromic lenses having peripheral edge surfaces prone to moisture gain or loss. In accordance with this invention, an edge seal is applied to the peripheral edge surface of a device by a method comprising: a) contacting a portion of the peripheral edge surface to be sealed with or immersing such portion in a sealant layer or sealant precursor layer disposed on or contained by a substrate or holder; b) rotating said device via a suitable rotation means so as to roll or rotate its peripheral edge surface through said sealant or sealant precursor layer, preferably at a predetermined depth; c) removing said device from said sealant or sealant precursor layer; and d) allowing sealant or sealant precursor deposited on said peripheral edge surface to cure, if necessary. This method can be used to place or form an edge seal along all or a portion of the peripheral edge surface of the device being sealed. The instant invention also relates to the resulting sealed devices.

Alternatively, the peripheral edge surface of a device to be sealed can be placed in contact with or dipped (to a predetermined depth) into a sealant layer or sealant precursor layer a plurality of times, with partial rotation of the device between each contact, thereby permitting new segments of its peripheral edge surface to contact the sealant layer or the sealant precursor layer after each rotation. This technique allows sealing of all or a portion of the peripheral edge surface of the device, depending upon the number of contact/rotation steps utilized.

The resulting edge seal on some or all of the peripheral edge surface of a device generally impedes moisture gain/loss to/from the device being sealed. In the case of an electrooptic device, such as a laminated electrochromic lens containing an ion-conducting polymer (ICP) layer, the seal preferably contacts and covers the ICP layer, which helps to maintain the water content of the ICP layer within a suitable range. This in turn helps to maintain ion-mobility and device operability.

DETAILED DESCRIPTION OF THE INVENTION

The present invention relates to methods and systems for applying a seal to the peripheral edge surface of a device, particularly a device prone to moisture gain or loss through its peripheral edge surface. Exemplary of devices suitable for sealing according to the instant invention is a laminated electrooptic device, said device comprising first and second substrates, at least one of which may be a coated substrate, and an ion-conducting material layer which is disposed between said first and second substrates. In general terms, the instant method comprises: a) contacting a portion or a predetermined section of the peripheral edge surface of a device to be sealed with a sealant layer or a sealant precursor layer disposed on or held by a holder or substrate; b) rotating said device via a suitable rotation means so as to roll or rotate its peripheral edge surface through said sealant layer or sealant precursor layer, preferably at a predetermined depth, thereby depositing sealant or sealant precursor on said peripheral edge surface; c) removing said device from said sealant layer or sealant precursor layer; and d) allowing sealant or sealant precursor deposited on said peripheral edge surface to cure, if necessary. The steps of this method, which places or forms what is herein termed a "rolled edge seal" on the peripheral edge surface of the device being treated, can be repeated to increase the thickness of the seal being applied and/or to place a seal comprising a plurality of different sealants on the peripheral edge surface of the device being sealed.

Another embodiment of the instant invention is directed to a method for applying a moisture seal to some or all of the peripheral edge surface of a laminated electrooptic device, said peripheral edge surface comprising the outer peripheral surfaces of first and second substrates (e.g., lenses) and the outer peripheral surface of a bonding layer, preferably an ion-conducting polymer (ICP) layer, wherein the outer peripheral surface of said bonding layer is situated between the outer peripheral surfaces of said first and second substrates and is prone to moisture gain or loss. This method comprises: a) immersing, preferably to a predetermined depth, a portion of the peripheral edge surface of the device to be sealed into a sealant layer or sealant precursor layer; b) rotating the device so as to rotate or roll its peripheral edge surface through said sealant layer or sealant precursor layer, thereby placing or depositing a cap of sealant or sealant precursor on said peripheral edge surface; c) removing the device from the sealant layer or sealant precursor layer; and d) allowing sealant or sealant precursor deposited or placed on the peripheral edge surface to cure, if necessary. In the case of a laminated electrochromic lens containing an ion-conducting polymer interlayer, the resulting edge seal is preferably positioned over the outer peripheral surface of the ICP layer, on the peripheral edge surface of the lens, thereby impeding moisture ingress and egress to/from the ICP layer.

Alternatively, a portion of the peripheral edge surface of a device to be sealed can be dipped into a sealant layer or sealant precursor layer, preferably to a predetermined depth, removed from said layer, rotated to expose a different portion of the peripheral edge surface to said layer, and then dipped again. These dipping/rotating steps can be repeated any number of times to seal as much of the peripheral edge surface of the device as desired or to build thicker seals.

In a preferred embodiment, a laminated electrochromic device which is generally but not necessarily shaped like a disk or lens and which has first and second expanse surfaces and a peripheral edge region or surface between its expanse surfaces, wherein the edges of the various layers comprising the laminate are exposed, is sealed by placing a portion of the device edge into a sealant layer or sealant precursor layer, rolling or rotating the device to expose different portions of its peripheral edge surface to the sealant layer or the sealant precursor layer, thereby causing sealant or sealant precursor to be deposited on the peripheral edge surface of the device, removing the device from the sealant layer or sealant precursor layer and, if necessary, allowing the sealant or sealant precursor deposited on the peripheral edge surface to cure, resulting in a laminated electrochromic device having a rolled edge seal on its peripheral edge surface.

The instant invention is further directed to edge-sealed devices prepared via the above-described methods, i.e., devices having edge seals applied by rolling or rotating the peripheral edge surface of a device through a sealant layer or a sealant precursor layer, thereby depositing sealant or sealant precursor on the peripheral edge surface of the device; removing the device from the sealant or sealant precursor layer, and allowing the sealant or sealant precursor deposited on the device to cure, dry or harden, if necessary. More particularly, the instant invention is directed to a laminated electrooptic device comprising an ion-conducting material layer disposed between a first substrate and a second substrate, said device having a peripheral edge surface prone to moisture gain or loss, wherein said peripheral edge surface contains a rolled edge seal contiguous with the outer peripheral surface of its ion-conducting material layer.

In still another embodiment, the instant invention is directed to a laminated electrochromic lens comprising an ion-conducting polymer (ICP) layer having an outer peripheral surface, wherein said ion-conducting polymer layer is disposed between a first coated lens and a second lens which may or may not be coated, said laminated electrochromic lens having a peripheral edge surface prone to moisture gain or loss through the outer surface of said ion-conducting polymer layer, wherein said peripheral edge surface contains a rolled edge seal in contact with the outer surface of said ion-conducting polymer layer. A key feature of the instant edge seal is that it helps to maintain the moisture content of ion-conducting materials within desired ranges, thereby enabling electrochromic devices prone to moisture loss or gain through their edges to function more reliably.

In accordance with the instant invention, a sealant or sealant precursor is positioned or disposed as a film or layer on a supporting substrate or holder. Preferably, the thickness of such film or layer for a given sealing system is set and/or maintained at a predetermined value, using a doctor blade or some other depth-setting technique. Edge seals are then formed by contacting, preferably by dipping to a predetermined level, the peripheral edge surface to be sealed into the sealant or sealant precursor film or layer contained on the substrate or holder. The device is then rolled or rotated, via a suitable rolling or rotating means, relative to the sealant layer or sealant precursor layer so as to roll or rotate its peripheral edge surface through the sealant or sealant precursor film or layer. This forms a sealant cap over the portions of a peripheral edge surface exposed to the sealant or sealant precursor film or layer. A cap can also be formed around the full periphery of a device by repeating a dipping, removal and rotation sequence, wherein rotation occurs outside of the sealant or sealant precursor film or layer.

As suitable alternatives, the peripheral edge of a device can be immersed into a sealant layer or sealant precursor layer until it contacts the substrate or container supporting the sealant or sealant precursor layer, or it can be immersed to a predetermined intermediate depth. Immersion of the device can be accomplished via any suitable means. It is noteworthy that the immersion depth must be sufficient to overcome the surface tension of the sealant layer or sealant precursor layer.

Generally, it is desirable to apply a seal or cap all the way around a device. Preferably, the seal or cap is of substantially uniform thickness. These objectives can be met by attaching or connecting the device to be sealed to a holding means. One type of holding means comprises a ride strip and, optionally, a shaft and operates in conjunction with a means for rotating the holding means and/or the device being sealed. For example, a holding means can be rotated via an axle or shaft which is preferably oriented substantially perpendicular to an expanse surface of a device being held for sealing. A rotation means operatively connected thereto causes the holding means to roll on its ride strip, thereby causing the device being held to roll or rotate through a sealant layer or sealant precursor layer at a depth set by the holding means. Alternatively, a holding means which allows rotation of the device being sealed relative to and in response to a moving sealant layer or sealant precursor layer can be used. In this embodiment, the holding means remains stationary and permits rotation of the device being sealed in response to the motion of the sealant or sealant precursor layer. As a third alternative, both the device being sealed and the sealant or sealant precursor layer can move independent of each other. Preferably, the holding means is shaped or cammed so that the peripheral edge of the device being sealed is immersed in a sealant layer or sealant precursor layer at a substantially constant depth.

The preferred laminated electrooptic devices of this invention are laminated electrochromic lenses which contain an ion-conducting material layer disposed between mated first and second substrates. The first and second substrates of the instant laminated electrochromic devices are generally glass or organic polymeric substrates conventionally used to prepare electrochromic articles or devices. Preferably, polymeric organic substrates are used. Substrates to which the sealing method of the present invention applies are preferably prepared from transparent materials suitable for producing eyewear lenses, such as lenses prepared from synthetic organic optical resins. Alternatively, the substrate can be a nontransparent solid material.

Suitable transparent lenses may have a conventional refractive index (1.48–1.5), a relatively high refractive index (1.60–1.75), or a mid-range refractive index (1.51–1.59), depending on the end use. Synthetic polymer substrates that may be used as a lens material include, but are not limited to: thermoplastic polycarbonates, such as the carbonate-linked resin derived from bisphenol A and phosgene, which is sold under the trademark LEXAN®; polyesters, such as the material sold under the trademark, MYLAR®; poly (methylmethacrylates), such as the material sold under the trademark, PLEXIGLAS®; and polymerizates of a polyol (allyl carbonate) monomer, especially diethylene glycol bis(allyl carbonate), which is sold under the trademark CR-39®. Copolymers of the aforedescribed monomers/resins may also be used as a lens material. These and other transparent and nontransparent polymeric substrates known in the art for use for various optical and non-optical applications may be used.

The profile of the peripheral edge surface of a device sealed by the instant method is not believed to be critical. Such peripheral edge surfaces can be flat, grooved, v-shaped, nubbed or irregularly shaped. Preferred laminated electrooptic devices are laminated electrochromic lenses having peripheral nubs thereon, as disclosed in U.S. Pat. No. 5,969,847, which is incorporated herein by reference. Preferred rolled edge seals cover at least the top half of such nubs.

The substrates of the instant method generally contain electroconductive films and at least one electrochromic film, i.e. a film of a persistent electrochromic material which in response to the application of an electric field of a given polarity and sufficient voltage changes from a high-transmittance, non-absorbing state to a lower-transmittance, absorbing or reflecting state. When an electric field of opposite polarity is applied to the electrochromic material, it switches back to a high-transmittance state. The electrochromic film, which is both an ionic and electronic conductor, is in ion-conductive contact, preferably direct physical contact, with the ion-conductive material.

The electrochromic film and ion-conducting material are disposed between two electrodes (i.e., electroconductive films) to form a cell. In some applications, a complementary electrochromic film is also present in the cell, while in other applications an optically passive film or metal is used in place of the complementary electrochromic film to form the cell.

Conventionally, in the preparation of electrochromic lenses, a cathodically coloring electrochromic material, usually tungsten oxide or compounds thereof, is deposited at a thickness of about 800 to 5,000 Angstroms on a transparent substrate that has been previously coated with an electroconductive metal oxide film, such as tin oxide or indium tin oxide (ITO), which electroconductive film serves as one electrode. Preferably, the electroconductive film comprises an indium:tin weight ratio of about 90:10. The film thickness is preferably in the range of 800 to 4,000 Angstroms for acceptable conductivity. The electroconductive and electrochromic films may be deposited by a variety of methods so long as the substrate is not deleteriously affected. The adhesion of an electroconductive metal oxide film directly to a plastic substrate may be improved by application of a primer to said substrate prior to coating. See, for example, U.S. Pat. No. 5,471,338 to Yu, Backfisch and Rukavina.

In such lenses, the counter electrode is prepared by depositing a similar metal oxide coating on a second transparent substrate, with or without a complementary electrochromic film. A suitable complementary electrochromic film is a nitrogen-containing iridium oxide film as disclosed in U.S. Pat. No. 5,618,390, to Yu, Backfisch et al. The ion-conducting material is then disposed between substrates so coated; in the case of ion-conductive polymers, a precursor composition is generally cured or polymerized in situ by energy which passes through a substrate coated with an electroconductive film and/or an electrochromic film.

Laminated electrochromic eyeglass lenses are generally formed by bonding first and second lenses together, wherein each lens comprises a coated transparent substrate. Bonding is preferably accomplished by placing a curable ion-conducting polymer composition, i.e. a monomer solution containing one or more monomers, an effective amount of an initiator and optionally one or more non-reactive diluents and/or additives, on the concave interface surface of a matched lens pair and moving the concave interface surface and the convex interface surface of the corresponding lens toward each other, thereby spreading the curable adhesive composition between the lenses. The curable ICP composition is then cured via exposure to a suitable energy source. Curing of the polymer places an ion-conducting polymer between the lenses while bonding the lenses into a laminate, thereby facilitating necessary ion flow. A preferred method of lamination is the suspension lamination technique discussed in U.S. Pat. No. 5,916,398.

Various ion-conducting materials can be used, including for example, materials comprising hydrogen uranyl phosphate or polyethylene oxide/$LiClO_4$. Also, ion-conducting polymer electrolytes or inorganic films such as $LiNbO_3$, $LiBo_3$, $LiTaO_3$, LiF, $Ta_2O_5$, $Na_2AlF_6$, $Sb_2O_5$ $nH_2O+Sb_2O_3$, $Na_2O$ $11Al_2O_3$, $MgF_2$, $ZrO_2$, $Nb_2O_5$ and $Al_2O_3$ can be used as the ion-conducting material. Preferred ion-conducting materials are ion-conducting polymers; these polymers generally serve the dual functions of being ion-conducting electrolytes and mechanical adhesives. One class of suitable ion-conducting materials includes ion-containing polymers known as ionomers. These macromolecules contain ionizable groups covalently linked to a polymer chain, typically a hydrocarbon. Polystyrene sulfonic acid and poly (2-acrylamido-2-methyl-1-propanesulfonic acid) are examples of ionomers, both incorporating the protonic acid $SO_3H$ group on the polymer chain. Ionomers are generally formed by polymerizing monomers bearing both an ionizable group and an ethylenic, e.g. vinylic, group.

In accordance with a preferred embodiment of the present invention, the ion-conducting polymer electrolyte is a proton-conducting polymer selected from the group consisting of homopolymers of 2-acrylamido-2-methylpropanesulfonic acid (AMPSA) and copolymers of AMPSA with various monomers. Such polymers may be utilized in the form of preformed sheets which are laminated between the substrates, or in the form of liquid reaction mixtures of monomers which are cast and cured in place between the substrates. A preferred proton-conducting polymer electrolyte in accordance with the present invention is a copolymer of AMPSA and N,N-dimethylacrylamide (DMA), preferably cast and cured in place. More preferred copolymers of AMPSA and DMA are prepared from AMPSA and DMA monomers in a molar ratio range of about 1:3 to 1:2. The thickness of the polymer electrolyte is not believed to be critical but in general is in the range of 0.001 to 0.025 inch (0.0254 to 0.625 millimeter).

After lamination, the laminated electrochromic device, preferably an electrochromic eyewear lens, comprises an ion-conducting material, preferably an ion-conducting polymer which also serves as a bonding agent, sandwiched between two coated substrates. Absent an edge seal, the ion-conducting material is exposed to the environment along the edge of the laminate. To reduce moisture transfer into or out of this layer, it is desirable to seal the edge of the lens, prior to installation into a holding device such as an eyewear frame, via the instant invention.

Any sealant or sealant precursor suitable for forming a rolled edge seal in accordance with the instant invention can be used. As used herein, the terms "sealant" and "sealant precursor" refer to materials applied to the peripheral edge surfaces of devices for the purpose of hindering moisture transport to/from such devices. Curing may or may not be necessary for a given sealant, but is generally required for sealant precursors. Sealant precursors include, for example, admixtures comprising components which, when combined, form suitable sealants upon curing. Preferred sealant precursors are admixtures which comprise: a) an epoxy resin ; b) an effective amount of a curing agent; and, optionally, c) an effective amount of a filler, solvent, diluent, plasticizer, accelerator, curative, toughener or other compatible ingredient. Sealant precursors therefore include uncured or partially cured admixtures which, when cured, form epoxy sealants which impede moisture transport. Sealant precursors can be prepared via conventional techniques well known to skilled practitioners. Similarly, curing of a sealant or sealant precursor can be accomplished via conventional techniques, if curing is required.

More particularly, instant rolled edge seals can comprise any sealant which impedes moisture transport, has suitable adherence characteristics and is capable of being rolled onto the peripheral edge surface of a laminated electrooptic device. Preferred sealants for sealing the edges of electrochromic devices are epoxy sealants, particularly those that adhere readily to glass and/or organic substrates. As used herein, "epoxy sealants" refer to those sealants formed by curing a resin characterized by the presence of an oxirane ring. Such resins may contain aliphatic, cycloaliphatic, heterocylic or aromatic backbones. Though resins, curing agents, cure times and temperatures are not critical to the instant invention, preferred epoxy sealants have cure times of about 0.5 min. to about 24 hours, and are cured at temperatures between about 40° F. and 100° F. (4.4° C. and 149° C.). Such epoxy sealants provide an impediment to moisture ingress and egress and generally impart structural integrity to laminated devices.

Typically, the instant epoxy sealants are formed by combining an epoxy resin with a curing agent as a sealant precursor. Thus, an effective amount of a curing agent and resin are mixed so as to form a sealant precursor layer of specified thickness which is disposed on a substrate or held in a container. A suitable epoxy for use as a sealant in the instant method is Araldite® 2012, which is commercially available from Ciba Geigy.

The cross-sectional profile of the rolled edge seal generally conforms to the edge profile of the device being sealed. In the case of an electrochromic lens, the profile of the seal should not interfere with attachment of the lens to a suitable frame.

DESCRIPTION OF A PREFERRED EMBODIMENT

A further understanding of the instant invention will be obtained by reference to FIGS. 1–6, wherein like reference characters identify like parts throughout. It is noteworthy that FIGS. 1–6 are not drawn to scale, and that cross-hatching is for clarification purposes only, not to represent particular materials of construction.

Referring to FIG. 1, laminated ophthalmic lens 8 comprises first coated lens 1, second coated lens 2 and bonding layer 7. Common lamination terminology designates the front expanse surface 3 of lens 1 as the S1 surface. Rear mating surface 4 of lens 1 is the S2 surface. Likewise, front mating surface 5 of lens 2 is the S3 surface, and rear expanse surface 6 of lens 2 is the S4 surface. The S2 and S3 surfaces of complementary lenses 1 and 2 are the mating surfaces, i.e., the surfaces which are bonded to form a laminate, while the S1 and S4 surfaces are the optical surfaces. Laminated ophthalmic lens 8 is prepared by bonding front and rear lenses 1 and 2, respectively, using bonding agent 7.

Figure 2:
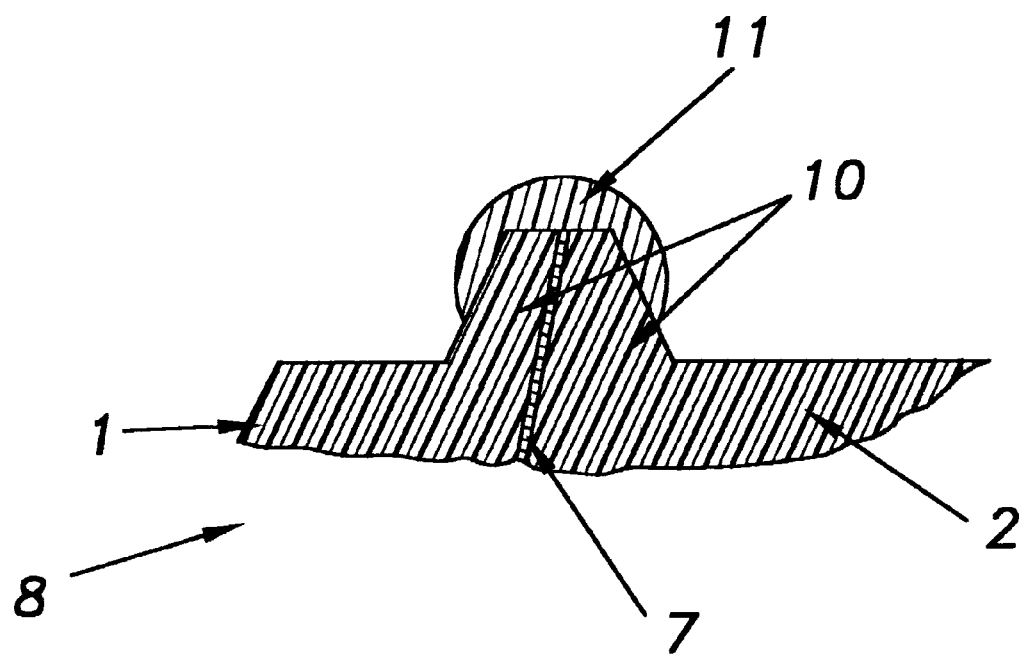
FIG. 2 is an enlarged cross-sectional view of the peripheral nub of FIG. 1 showing one embodiment of the rolled edge seal of the instant invention.

The overall surface area of laminated lens 8 comprises front optical surface S1, rear optical surface S4 and peripheral edge surface 9 between the S1 and S4 optical surfaces. Peripheral edge surface 9 of laminated lens 8 comprises the peripheral outer surface of front lens 1, the peripheral outer surface of the rear lens 2, and the peripheral outer surface of bonding layer 7, which bonding layer is prone to moisture gain or loss. Lens 8 also contains nub 10, which can be used to interlock with or support rolled edge seal 11, as shown in FIG. 2. Though nubbed edges are preferred, the edge profile of lens 8 can be rounded, flat, V-shaped, grooved or irregularly shaped.

Lens 1 is the front, e.g. plano, lens of laminated lens 8. The coatings on rear mating surface 4 of lens 1 are not shown; these are conventional electroconductive and electrochromic coatings used in the preparation of electrochromic lenses as described herein above and are not critical to the instant invention. Lens 1 is laminated to rear lens 2. The coatings on front mating surface S are not shown; these are conventional electroconductive and electrochromic coatings used in the preparation of electrochromic lenses as described herein above and are not critical to the instant invention. Ion-conducting polymer layer 7 is disposed between substrates 1 and 2; this layer serves as both an ion-conducting electrolyte and a mechanical adhesive which bonds coated lenses 1 and 2 to form laminated lens 8. On peripheral edge surface 9 of laminated lens 8, the outer peripheral surface of ion-conducting polymer layer 7 is exposed, absent edge seal 11. It is desirable to restrict water ingress and egress through peripheral edge surface 9 of the device by sealing the exposed outer peripheral surface of ICP layer 7. The initial water content of the ion-conducting polymer generally depends on the ion-conducting polymer used to laminate the device being sealed and is not critical to the instant invention.

Nub 10 is formed by edging lenses 1 and 2 so as to form half nubs on their peripheries that align with the outer surface of ICP layer 7. Thus, the exposed outer surface of ICP layer 7 is at or near the apex of nub 10. Any means suitable for edging one or both of the peripheral mating edges of lenses 1 and 2 can be used to form the half nubs. Conventional edging techniques known in the lens shaping art are acceptable. Nub 10 is preferably formed by edging lenses 1 and 2 prior to application of their respective coatings and prior to lamination via the tandem edging technique of U.S. Pat. Ser. No. 09/157,485, filed Sep. 21, 1998, to Coleman and Smith. When lenses 1 and 2 are laminated, the individual half nubs form nub 10 shown in the Figures.

Figure 3:
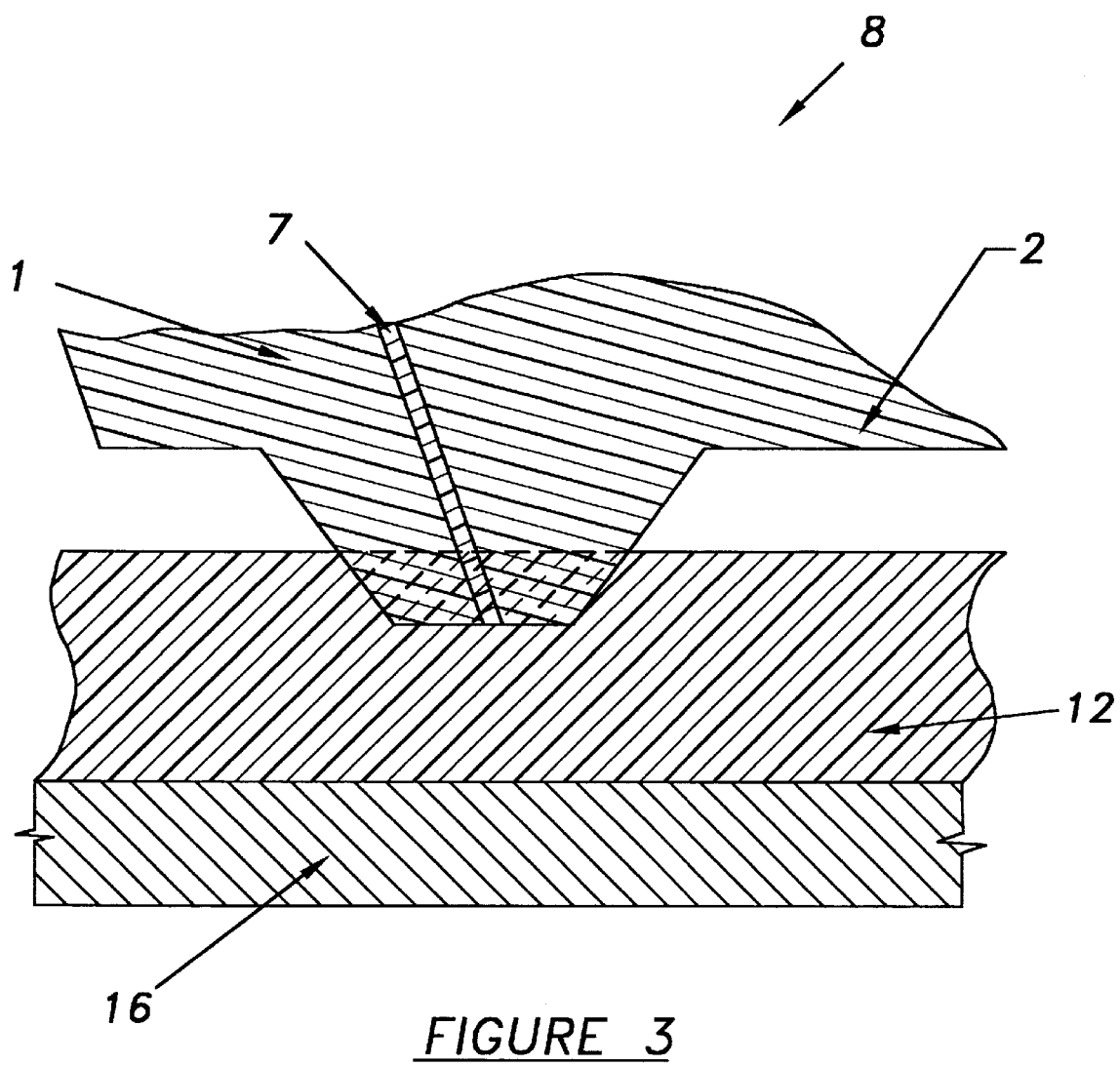
FIG. 3 is an enlarged cross-sectional view of the peripheral nub of FIG. 1 partially immersed in a sealant precursor layer.
Figure 6:
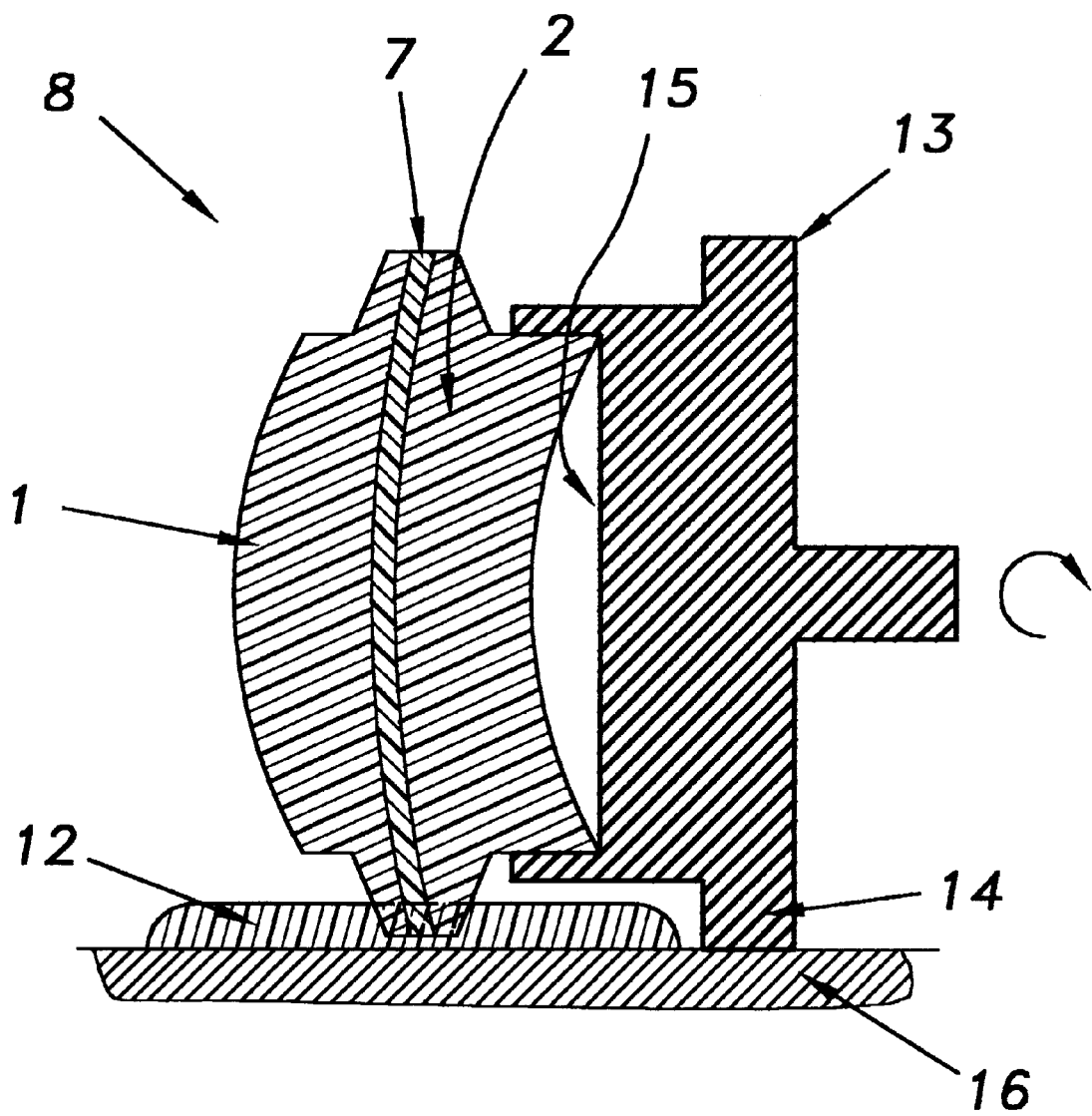
FIG. 6 is a cross-sectional side view of a laminated lens held by a holding means so as to be partially immersed in a sealant precursor layer.

Referring to FIGS. 3 and 6, sealant precursor layer 12, which is preferably an admixture comprising an epoxy resin and an effective amount of a curing agent, is added to or disposed on substrate 16 (FIG. 6). Any suitable substrate can be used, i.e., a substrate compatible with sealant precursor layer 12. Curing agent/resin mixing and addition of the resulting precursor 12 to substrate 16 can be accomplished by techniques well known in the art. For example, a suitable curing agent and epoxy resin can be combined in a mixing apparatus and exuded or poured onto substrate 16. A doctoring blade (not shown) can be used to maintain sealant precursor layer 12 at a predetermined height. Rolled edge seal 11 is then applied to laminated lens 8 by dipping a portion of peripheral edge region 9, e.g., a portion of nub 10, into sealant precursor layer 12, as shown in FIG. 3, and rotating lens 8 so that the portion of peripheral edge surface 9 immersed in sealant precursor layer 12 rolls or rotates through sealant precursor layer 12. This can be accomplished via any suitable rotation means, including rotation by hand. Alternatively, laminated lens 8 can be inserted into recess 15 of holding means 13. Ride strip 14 of holding means 13 contacts substrate 16 and, as holding means 13 rotates, nub 10 on peripheral edge surface 9 rotates through sealant precursor layer 12. As shown in FIGS. 5 and 6, nub 10 may or may not contact substrate 16. It is noteworthy that, if the device being sealed contacts substrate 16 through sealant precursor layer 12, sealant thickness is reduced to virtually zero at the point of contact. For this reason, it is preferred to use the substrate contact method with edge designs such as V-grooves, where the ICP surface to be sealed is situated within the V.

EXAMPLES

The following examples are presented for illustrative purposes only and are not intended to limit the invention in any way.

Example 1

Applying a Rolled Edge Seal to An Electrochromic Lens

A laminated electrochromic lens having a continuous peripheral edge nub aligned with its ion-conducting polymer layer was constructed by a cast-in-place lamination technique as described below. The priming, cleaning, coating, bus bar, edging, charging, ion-conducting polymer and laminating aspects of this example are not part of the instant invention.

Each of a matched pair of plastic lenses, polymerized from CR-39® monomer and primed with an organo silane hardcoat, was edged using a Santinelli model C 291 Aculens edger to form a half-nub on its edge adjacent to its mating surface. The half nub on each lens was about 0.25 mm in width by about 1.0 mm height, resulting in a nub, after lamination, similar in shape to the nub shown in FIG. 3.

The edged lenses were cleaned and dried using an ultrasonic cleaning system, and a bus bar was applied to each of the half nubs via a conventional technique. Thin films of In$_2$O$_3$:SnO$_2$ (ITO) were then deposited onto the mating surfaces of the nubbed plastic substrates using direct current (dc) magnetron sputtering so as to contact ITO with the bus bar. Electrochromic layers were then separately deposited onto the respective ITO coated plastic substrates. A thin tungsten oxide film was deposited on one substrate by direct current magnetron sputtering, and a thin nitrogen-containing iridium oxide film was deposited on the other substrate by direct current magnetron sputtering.

Following these depositions, the IrOxNy/ITO/primer/polymer substrate was electrochemically charged (reduced) in 0.1 normal aqueous hydrochloric acid. The WO$_3$/ITO/primer/polymer substrate was not electrochemically treated. An ion-conducting polymer monomer solution comprising 2-acrylamido-2-methylpropanesulfonic acid (AMPSA) and N,N-dimethylacrylamide (DMA) in 1-methyl-2-pyrrolidinone (NMP) and water and containing an effective amount of a photoinitiator was prepared. This solution was placed between the WO$_3$ and nitrogen-containing iridium oxide half cells and then exposed to suitable energy to cure the ion-conducting polymer, resulting in a laminated electrochromic lens having a circumferential nub contiguous with its ICP layer.

The laminated electrochromic lens described above contained a 1 mm high nub at the interface of its front and rear lenses which was aligned with its AMPSA/DMA ICP layer. An Araldite® 2012 epoxy rolled edge seal was applied to the top half of the nub as follows: an epoxy sealant precursor layer, i.e., an admixture of Araldite 2012 components A and B combined in accordance with the manufacturer's instructions, was deposited onto a moving roll of 0.001 inch (0.025 mm) thick vinyl film. This film, after application of the sealant precursor, traveled under a doctor blade, which set the sealant precursor layer at a predetermined uniform thickness of 1.0 mm. The film thus served as a sealant precursor layer substrate which moved due to the influence of a conventional spool/motor arrangement at a speed of 10–100 cms/min., based on the setting of a film speed controller. The sealant precursor layer traveled under the electrochromic lens of Example 1, which was affixed to a cammed holding means which set it a height that allowed its nub to be half immersed in the sealant precursor layer. The holder was operatively connected to a rotation means which enabled the lens to be rotated at a peripheral edge speed of ±10 percent of the sealant precursor film speed, based on the setting of a rotation speed controller. As the peripheral nub rolled through the sealant precursor layer, it was submerged into, and exited out of, the sealant precursor layer. This caused sealant precursor to be deposited on the upper half of the nub; when the lens completed one rotation, the lens was removed from the sealant precursor layer and the sealant precursor was allowed to cure, resulting in a rolled edge seal substantially as shown in FIG. 2.

It is evident from the foregoing that various modifications, which are apparent to those skilled in the art, can be made to the embodiments of this invention without departing from the spirit or scope thereof. Having thus described the invention, it is claimed as follows.

I claim:

1. A method for applying an edge seal to a laminated ophthalmic lens having a peripheral edge surface, which method comprises: a) contacting a portion of said peripheral edge surface with a sealant layer or sealant precursor layer disposed on a substrate; b) rotating said lens so as to roll said peripheral edge surface through said sealant layer or sealant precursor layer, thereby depositing sealant or sealant precursor on said peripheral edge surface at a substantially uniform thickness as said peripheral edge rolls; and c) removing said lens from said sealant layer or sealant precursor layer, wherein said substantially uniform thickness is maintained via use of a cammed holding means.

2. A method for applying an edge seal to a laminated ophthalmic lens having a peripheral edge surface, which method comprises: a) contacting a portion of said peripheral edge surface with a sealant layer or sealant precursor layer disposed on a substrate; b) rotating said lens so as to roll said peripheral edge surface through said sealant layer or sealant precursor layer, thereby depositing sealant or sealant precursor on said peripheral edge surface at a substantially uniform thickness as said peripheral edge rolls; and c) removing said lens from said sealant layer or sealant precursor layer, wherein said substantially uniform thickness is maintained by contacting said peripheral edge surface with said substrate as said peripheral edge surface rolls through said sealant or sealant precursor layer.

3. The method of claim 1, wherein said peripheral edge surface contains a nub.

4. The method of claim 1 or claim 2, wherein said lens contains an ion-conducting polymer layer which is in contact with said deposited sealant or sealant precursor.

5. The method of claim 1 or claim 2, wherein said seal is an epoxy.

6. The method of claim 4, wherein said seal is an epoxy.

7. The method of claim 2, wherein said peripheral edge surface is grooved.

8. A method for applying a seal to a laminated electrooptic device having a peripheral edge surface, which method comprises: a) inserting said device into a holding means having a ride strip; b) immersing a portion of said peripheral edge surface into a sealant layer or sealant precursor layer disposed on a substrate; c) rolling said holding means on said ride strip so as to rotate or roll said peripheral edge surface through said sealant layer or sealant precursor layer, thereby depositing a cap of sealant or sealant precursor on said peripheral edge surface; d) removing said device from said sealant layer or sealant precursor layer; and e) allowing sealant or sealant precursor deposited on said peripheral edge surface to cure, if necessary.

9. The method of claim 8, wherein said holding means is cammed so as to maintain immersion at a substantially constant depth as said peripheral edge surface rotates or rolls through said sealant or sealant precursor layer.

10. The method of claim 8, wherein said peripheral edge surface contacts said substrate as it rolls through said sealant or sealant precursor layer.

11. The method of claim 8, wherein said device is a laminated electrochromic lens.

12. A method for applying a seal to a laminated electrooptic device having a peripheral edge surface, which method comprises: a) inserting said device into a stationary holding means which allows said device to rotate; b) immersing said peripheral edge surface into a sealant layer or sealant precursor layer disposed on a substrate; c) causing said sealant or sealant precursor layer to move relative to said holding means, thereby rotating said peripheral edge surface through said sealant layer or sealant precursor layer and depositing sealant or sealant precursor on said peripheral edge surface; d) removing said device from said sealant layer or sealant precursor layer; and e) allowing sealant or sealant precursor deposited on said peripheral edge surface to cure, if necessary, wherein said holding means is cammed so as to maintain immersion at a substantially constant depth as said device rotates.

13. A method for applying a seal to a laminated electrooptic device having a peripheral edge surface, which method comprises: a) inserting said device into a stationary holding means which allows said device to rotate; b) immersing said peripheral edge surface into a sealant layer or sealant precursor layer disposed on a substrate; c) causing said sealant or sealant precursor layer to move relative to said holding means, thereby rotating said peripheral edge surface through said sealant layer or sealant precursor layer and depositing sealant or sealant precursor on said peripheral edge surface; d) removing said device from said sealant layer or sealant precursor layer; and e) allowing sealant or sealant precursor deposited on said peripheral edge surface to cure, if necessary, wherein said peripheral edge surface contacts said substrate as said device rotates.

14. The method of claim 12 or claim 13, wherein said device is a laminated electrochromic lens.

* * * * *